US008172184B2

(12) United States Patent
Spencer et al.

(10) Patent No.: US 8,172,184 B2
(45) Date of Patent: May 8, 2012

(54) AERIAL TRANSPORT APPARATUS

(76) Inventors: Ken Spencer, Woodburn, OR (US); Todd Humbert, Chandler, AZ (US)

(*) Notice: Subject to any disclaimer, the term of this patent is extended or adjusted under 35 U.S.C. 154(b) by 442 days.

(21) Appl. No.: 12/366,530

(22) Filed: Feb. 5, 2009

(65) Prior Publication Data

US 2010/0193639 A1 Aug. 5, 2010

Related U.S. Application Data

(60) Provisional application No. 61/026,457, filed on Feb. 5, 2008.

(51) Int. Cl.
*B64D 1/12* (2006.01)

(52) U.S. Cl. ................. 244/137.4; 244/137.1; 294/82.1; 294/82.11; 294/82.17; 294/82.24; 294/82.31

(58) Field of Classification Search ............... 244/137.4, 244/137.1; 294/82.1, 82.11, 82.17, 82.19, 294/82.24, 82.31
See application file for complete search history.

(56) References Cited

U.S. PATENT DOCUMENTS

| | | | | |
|---|---|---|---|---|
| 2,009,474 | A | 4/1905 | Castelli | |
| 2,433,859 | A | 1/1948 | McCormick | |
| 2,673,116 | A | 3/1954 | Baird | |
| 2,986,421 | A | 5/1961 | Grove | |
| 3,032,365 | A | 5/1962 | Campbell | |
| 3,042,385 | A | 7/1962 | Smith | |
| 3,146,853 | A | 9/1964 | Eckels | |
| 3,163,401 | A | 12/1964 | Johnston et al. | |
| 3,176,795 | A | 4/1965 | Taylor | |
| 3,561,809 | A | 2/1971 | Harding | |
| 3,666,216 | A | 5/1972 | Nagy | |
| 3,863,736 | A | 2/1975 | McWilliams | |
| 4,130,313 | A | 12/1978 | Clifford | |
| 4,149,746 | A | 4/1979 | Androski | |
| 4,173,366 | A | 11/1979 | Mattei et al. | |
| 4,185,862 | A | 1/1980 | Slocombe | |
| 4,256,338 | A * | 3/1981 | McLennan | 294/82.1 |
| 4,422,528 | A | 12/1983 | Patterson | |
| 4,441,750 | A * | 4/1984 | Reber | 294/82.24 |
| 4,682,804 | A | 7/1987 | Palmer et al. | |
| 4,998,763 | A * | 3/1991 | Henke | 294/82.33 |
| 5,040,748 | A | 8/1991 | Torre et al. | |
| 5,190,331 | A | 3/1993 | Corbin | |
| 5,273,333 | A | 12/1993 | Hatfield et al. | |
| 5,499,785 | A | 3/1996 | Roberts et al. | |

(Continued)

FOREIGN PATENT DOCUMENTS

AT 98746 12/1924

OTHER PUBLICATIONS

Supplemental Type Certificate SR01270SE, US Department of Transportation, Feb. 9, 2005.

(Continued)

*Primary Examiner* — J. Woodrow Eldred
(74) *Attorney, Agent, or Firm* — Stolowitz Ford Cowger LLP

(57) ABSTRACT

The invention provides a cargo hook apparatus for securing cargo external to an aircraft for transportation, the apparatus comprising, pendent sling means, an attachment for securing the pendent sling means to the aircraft, and a cargo hook assembly, where the cargo hook assembly comprises a high-strength, lightweight alloy, and where the cargo hook assembly weighs less than about 55 pounds.

23 Claims, 8 Drawing Sheets

U.S. PATENT DOCUMENTS

| | | | | |
|---|---|---|---|---|
| 5,593,113 | A | 1/1997 | Cox | |
| 5,850,991 | A | 12/1998 | Hainsworth et al. | |
| 6,079,761 | A * | 6/2000 | Sadeck | 294/82.1 |
| 6,167,928 | B1 | 1/2001 | Jarman | |
| 6,189,834 | B1 | 2/2001 | Dietz et al. | |
| 6,296,288 | B1 | 10/2001 | Khachaturian | |
| 2008/0011902 | A1 | 1/2008 | Fox | |

OTHER PUBLICATIONS

International Search Report for PCT/US2009/033257; Date of Mailing Sep. 24, 2009.
Written Opinion for PCT/US2009/033257; Date of Mailing Sep. 24, 2009.
Listing of Related Cases, Stolowitz Ford Cowger LLP, Dec. 22, 2011.

* cited by examiner

AERIAL TRANSPORT APPARATUS

REFERENCE TO THE RELATED APPLICATION

This application claims the benefit of United States Provisional Patent Application Ser. No. 61/026,457, filed Feb. 5, 2008.

BACKGROUND OF THE INVENTION

1. Field of the Invention

The invention relates to the field of systems for securing and transporting cargo external to an aircraft.

2. Description of Related Art

The cargo-carrying capability of aircraft is limited to cargo having overall external dimensions that are compatible with the dimensions of the aircraft cargo door(s), i.e., that can be loaded through the cargo door(s). Pragmatically, therefore, oversized cargo (external dimensions greater than the cargo door dimensions) or cargo having unusual external dimensions/configurations cannot be transported internally within the aircraft.

Various aerial transport systems are known that utilize an external securement system for transportation of larger loads. Helicopters, in particular, are often adapted for use in the transportation of large or bulky goods externally to the craft, such as timber, vehicles, and particularly large cargo containers. Typical underslung load hooks are capable of carrying external loads of at least 10,000 pounds.

One system for securing loads involves an underslung hook assembly, with a hook rigged to a pendent line, which is in turn attached to the aircraft external surface. U.S. Pat. No. 4,441,750, teaches a cargo sling system for suspension from an aircraft. The system includes a remotely actuable hook assembly and a guide that includes ring-like retainers through which sling lines pass after passage about the load.

U.S. Pat. No. 6,167,928, discloses a method of logging a tree utilizing a logging tool with a body having a connection for a lifting device using a hook. A guide extends vertically downwards away from the body when the tool is connected only to the lifting device. There is a hook on the body to one side of the guide for engaging an object. When the hook engages an object and the body is lifted by the lifting device, the body rotates and the guide rotates about the hinge so that the guide continues to extend vertically.

For safety concerns, the systems are typically provided with a system for releasing the load under controlled circumstances. U.S. Pat. No. 5,850,991, teaches a mechanical emergency dual-release mechanism for an external cargo hook system of an aircraft, where the hook assembly is operative to jettison an externally-attached cargo. The cabin pulley assembly is functionally interconnected to the cargo hook assembly and operative in response to a mechanical stimulus generated by means of the cockpit pulley assembly or the cabin pulley assembly to activate the cargo hook assembly to jettison the externally-attached cargo.

These and other related hook assemblies typically include a release that is actuable from the aircraft, which can be electric, manual, or both. An external cargo hook system allows oversized cargo or cargo having unusual external dimensions/configurations to be readily transported by the aircraft. While an external cargo hook system does enhance the versatility of the aircraft, it also poses some considerations that impact the overall design of the aircraft.

One disadvantage of the systems is that the components add both weight and drag to the aircraft. Drag is a particular problem for aircrafts that are capable of high speed flight, and the problem is magnified where the aircraft pendent guide lines and hooks are attached. Externally-attached cargo is typically suspended some distance below the aircraft such that the aircraft and its externally-attached cargo in effect define a pendent, or pendulum system, with the aircraft acting as the fixed support for the pendent. The weight and bulk of this system can reduce the speed and or add enough to the weight of the aircraft to decrease fuel efficiency.

The added weight is particularly problematic for aircraft systems that are only occasionally employed in the transport of cargo, yet are required to carry a cargo assembly at all times. In this situation, the assembly can add considerable weight, even when stowed on board the aircraft, and decrease the fuel efficiency of the aircraft in normal operation.

None of the prior approaches have been able to provide and external cargo system that addresses the requirements of aircraft systems that are capable both of flight at high speeds and still be rigged for carrying external loads.

SUMMARY OF THE INVENTION

This invention provides a cargo hook apparatus for securing cargo external to an aircraft for transportation, the apparatus comprising, pendent sling means, an attachment for securing the pendent sling means to the aircraft, and a cargo hook assembly, where the cargo hook assembly comprises a high-strength, lightweight alloy, and where the cargo hook assembly weighs less than about 55 pounds.

In a preferred embodiment of the apparatus of the invention, the disengage unit can support a load of at least about 22,000 pounds during transportation at aircraft speeds of at least about 100 knots. In a further preferred embodiment of the invention, the disengage unit can support a load of at least about 24,000 pounds. In a still further preferred embodiment of the invention, the disengage unit can support a load of at least about 26,000 pounds.

In a different preferred embodiment of the invention, the disengage unit of the apparatus can support the load at aircraft speeds of at least about 150 knots. In further such preferred embodiment, the disengage unit can support the load at aircraft speeds of at least about 200 knots.

In another preferred embodiment of the invention, the disengage unit weighs less than about 50 pounds. In a different aspect of this preferred embodiment, the disengage unit weighs less than about 45 pounds.

In an additional preferred embodiment of the invention, the alloy is an aluminum alloy. In a still further preferred embodiment of this embodiment, the aluminum alloy is selected from the group of aluminum alloys consisting of as γ-titanium aluminides and aluminum-metal-matrix-composites. In another preferred embodiment, the alloy is high tensile strength steel alloy. In a still other preferred embodiment, the alloy is high tensile strength titanium-based alloy.

In one aspect of the invention, the aircraft is a helicopter.

In another aspect of the invention, the aircraft is an airplane. In a preferred such aspect, the airplane is a propeller powered aircraft. In a different preferred aspect, the airplane is a jet powered aircraft.

These and other features and advantages of this invention are described in, or are apparent from, the following detailed description of various exemplary embodiments of the apparatus and methods according to this invention.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF THE INVENTION

The products and methods of the present invention provide an external cargo sling assembly for an aircraft that achieves goals of combinations of strength required for commercial and military cargo transport systems, and is also lightweight enough to be used with various aircraft systems, including on high speed aircrafts used for emergency and military applications.

Figure 1:
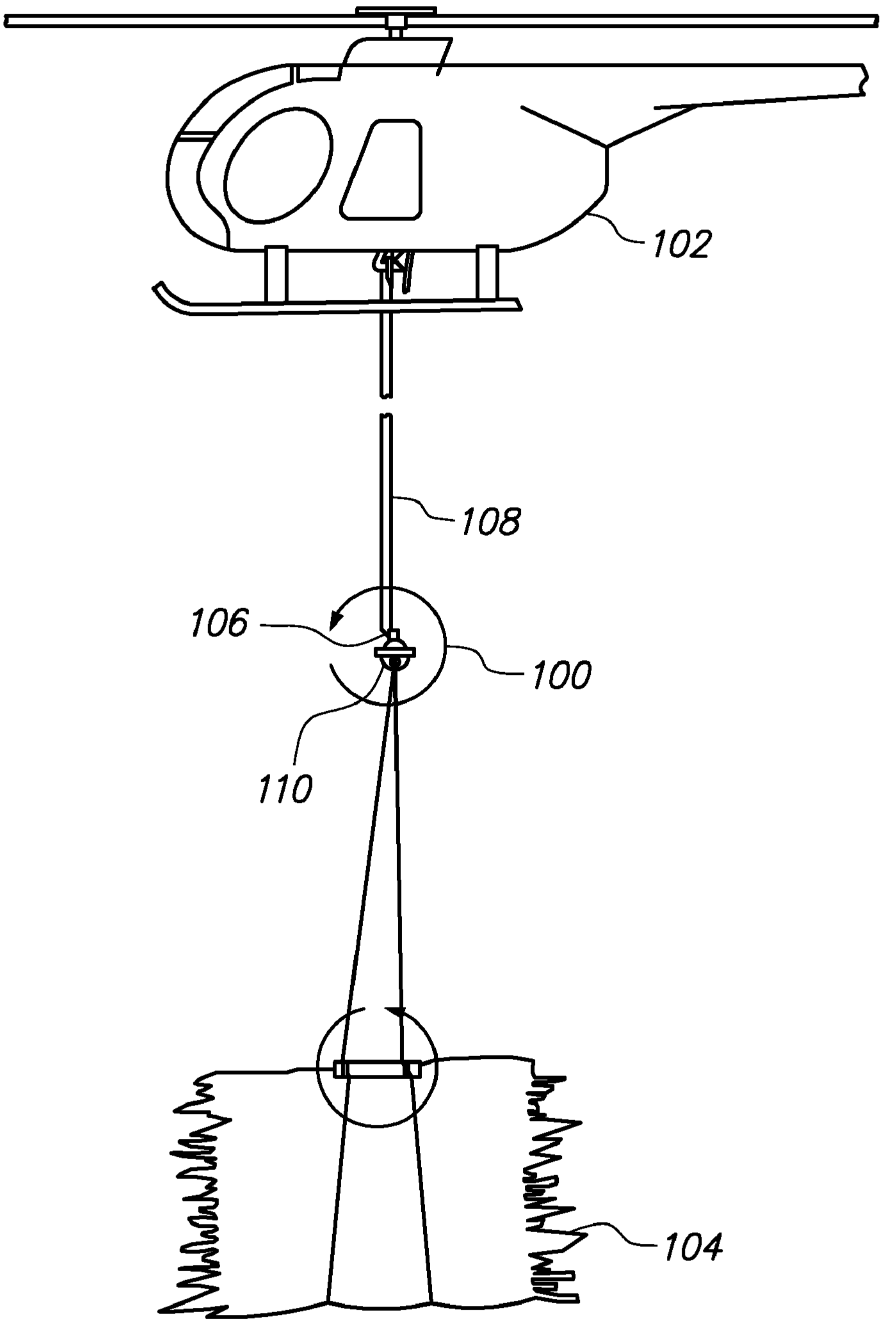
FIG. 1 illustrates an external cargo hook system adapted for use in carrying an external load by an aircraft.

Referring now to the FIG. 1, wherein like reference characters identify corresponding or similar elements throughout the several views, FIG. 1 exemplarily illustrates an external cargo hook system 100 as integrated in combination with an aircraft, which could be a helicopter, 102, for carrying a cargo load 104. The external cargo hook system 100 comprises a swivel attachment 106, a series of pendent guide lines 108, and a cargo hook assembly 110.

The cargo hook assembly 110 is configured to allow cargo 104 to be attached externally to the aircraft for transport thereof, with release systems to facilitate the immediate jettison of externally-attached cargo 104 in the event of an emergency situation.

The cargo hook assembly 110 can accommodate cargo 104 having a maximum weight of about 12,500 kilograms (26,000 pounds), and also accommodates a predetermined range of longitudinal and lateral motion of the externally-attached cargo 104 during flight operations.

Figure 2:
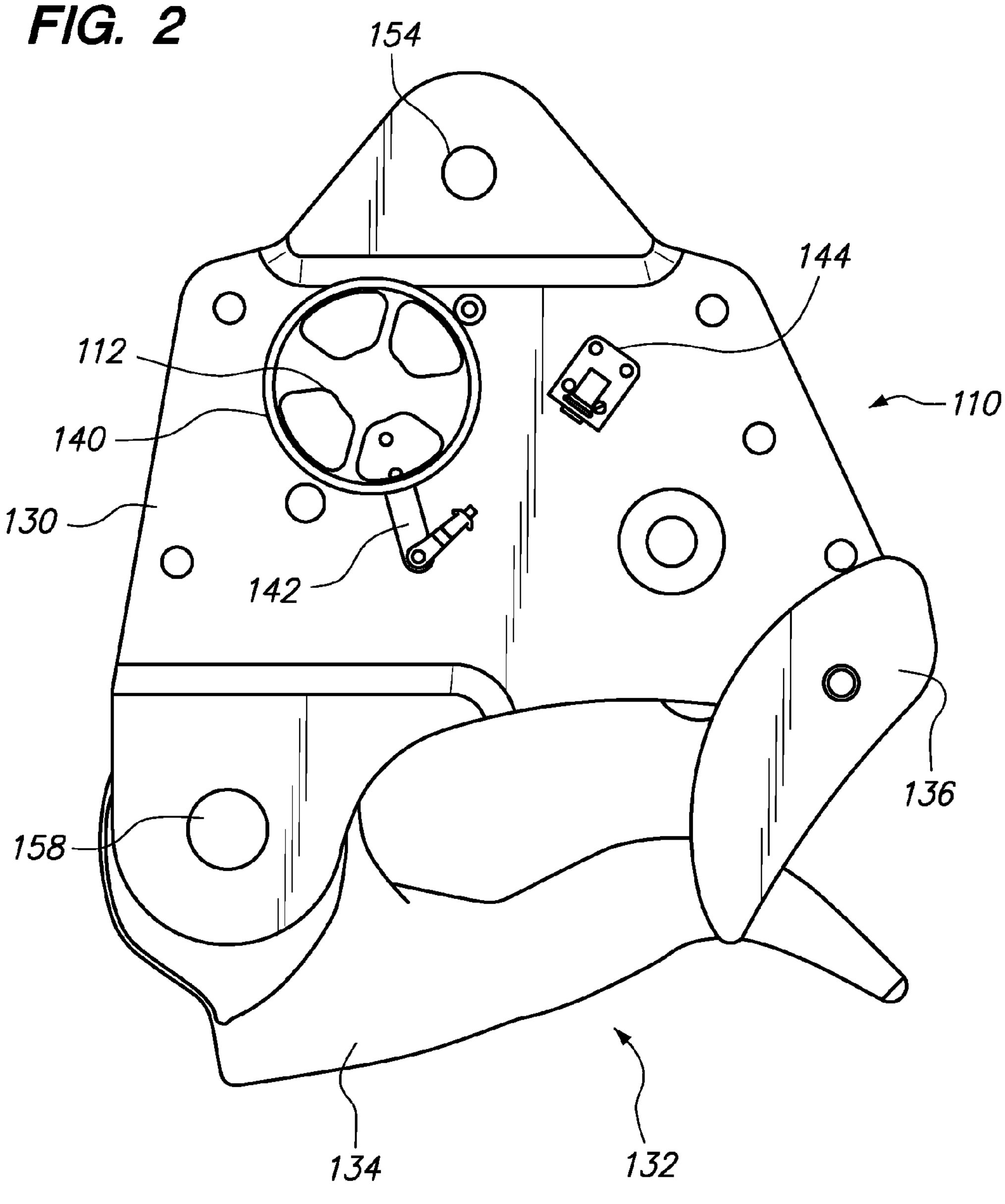
FIG. 2 is a side plan view of an exemplary embodiment of a cargo hook assembly of an external cargo hook system.
Figure 3:
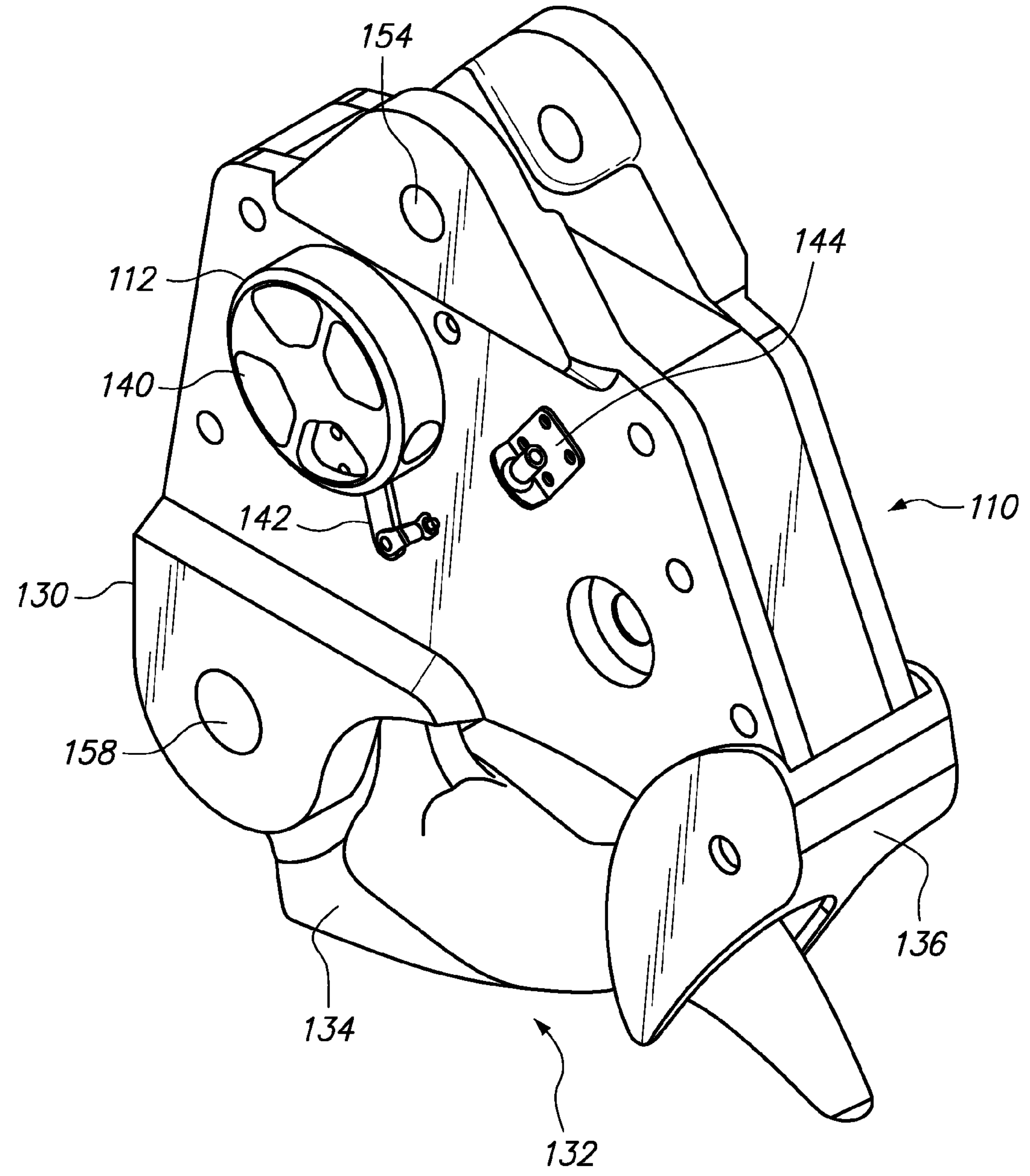
FIG. 3 is a perspective view of the cargo hook assembly of FIG. 2.
Figure 4:
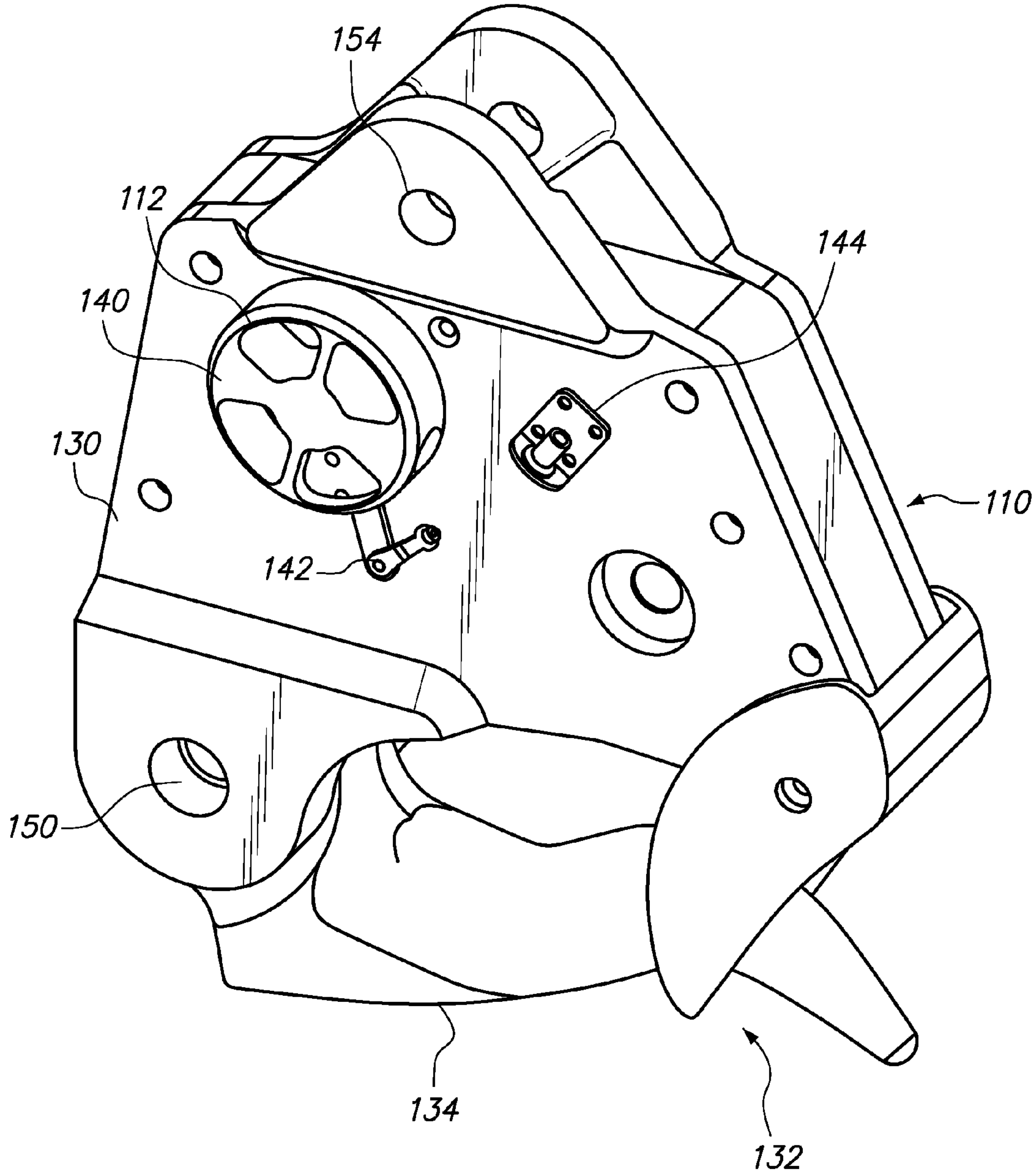
FIG. 4 is a second perspective view of the cargo hook assembly of FIG. 3.

In further reference to FIGS. 2, 3 and 4, the emergency cargo-release subsystem 112 is a manually operated subsystem, e.g., a manually-actuated release, that includes a cockpit actuation mechanism. Various emergency cargo-release systems are known to the art, and are operative to allow the flight crew, i.e., pilot or co-pilot, to manually actuate the cargo hook assembly 110 to immediately disengage the externally-attached cargo 104, i.e., jettison the externally-attached cargo 104, in an emergency situation.

The present invention is described with respect to external cargo hook systems 100 that are designed to allow the cargo hook assembly 110 to be stowed within the aircraft airframe when the external cargo hook system 100 is not being utilized. Stowage of the cargo hook assembly 110 when not in use allows the helicopter 102, or other aircraft, to be operated with a cleaner aerodynamic profile, i.e., less profile drag, thereby enhancing the operating efficiency of the aircraft 102, e.g., higher operating flight speeds, lower fuel consumption.

Referring again to FIGS. 2, 3 and 4, the cargo hook assembly 110 comprises a main body 130 and a disengage unit 132. The disengage unit 132 comprises a load arm 134, and a keeper 136. The disengage unit 132 is operative to facilitate the attachment of cargo 104 in combination with the cargo hook assembly 110 for subsequent transport of such cargo 104. The keeper 136 mechanically interacts with the load arm 134 to preclude the attached cargo 104 from inadvertently disengaging from the cargo hook assembly 110 during transport of such cargo 104.

The disengage unit 132 is connected with the emergency cargo-release subsystem 112, in an arrangement that controls the status of the keeper 136'in combination with the cargo hook assembly 110. The disengage unit 132 is operative, in response to mechanical actuation (from the primary emergency cargo-release subsystem 112) to automatically disengage/jettison cargo 104.

The subsystem 112 generally comprises a pulley axle 140 and a cable connector 142, with a pulley return spring (not shown) operative to return the pulley axle 140 to a releasing position.

A cockpit control cable will secured through the cable router 144, and routed to the helicopter 102, so that the other end thereof terminates in an actuating device or mechanism, e.g., a release handle (not shown), in the cockpit. Manual actuation of the cockpit release handle by the pilot or copilot results in a physical displacement of the cockpit control cable that causes a corresponding rotation of the pulley axle 140. Upon cessation of the manual actuation force by the pilot/copilot, the pulley axle 140 is operative to bias the subsystem back to the neutral position.

Figure 5:
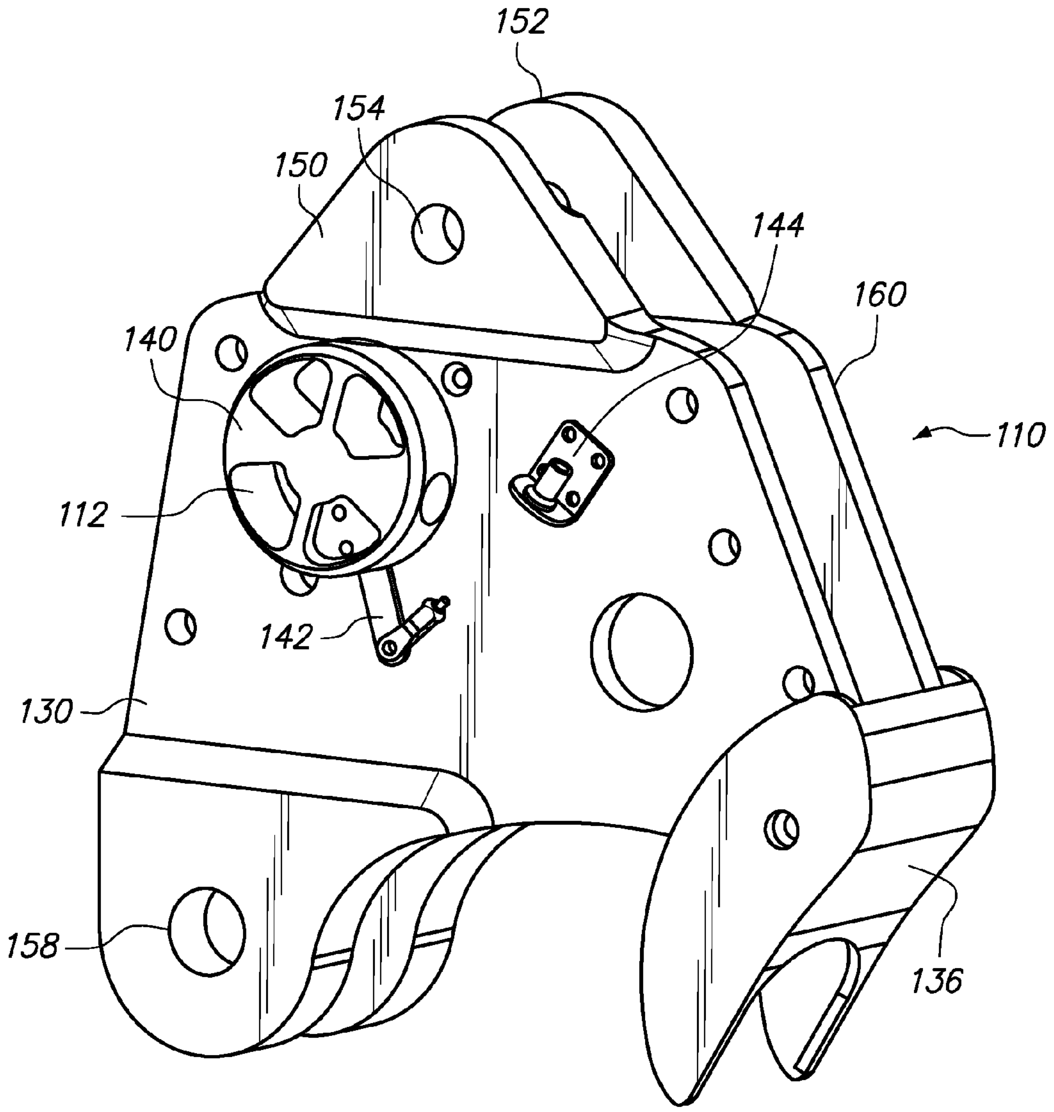
FIG. 5 is a view of the main body of the hook assembly minus the load arm.

In reference now to FIG. 5, and also FIGS. 2, 3 and 4, it is seen that the main body 130 is assembled from component parts, including first and second side plates 150 and 152, and a central spacer 160.

Figure 6:
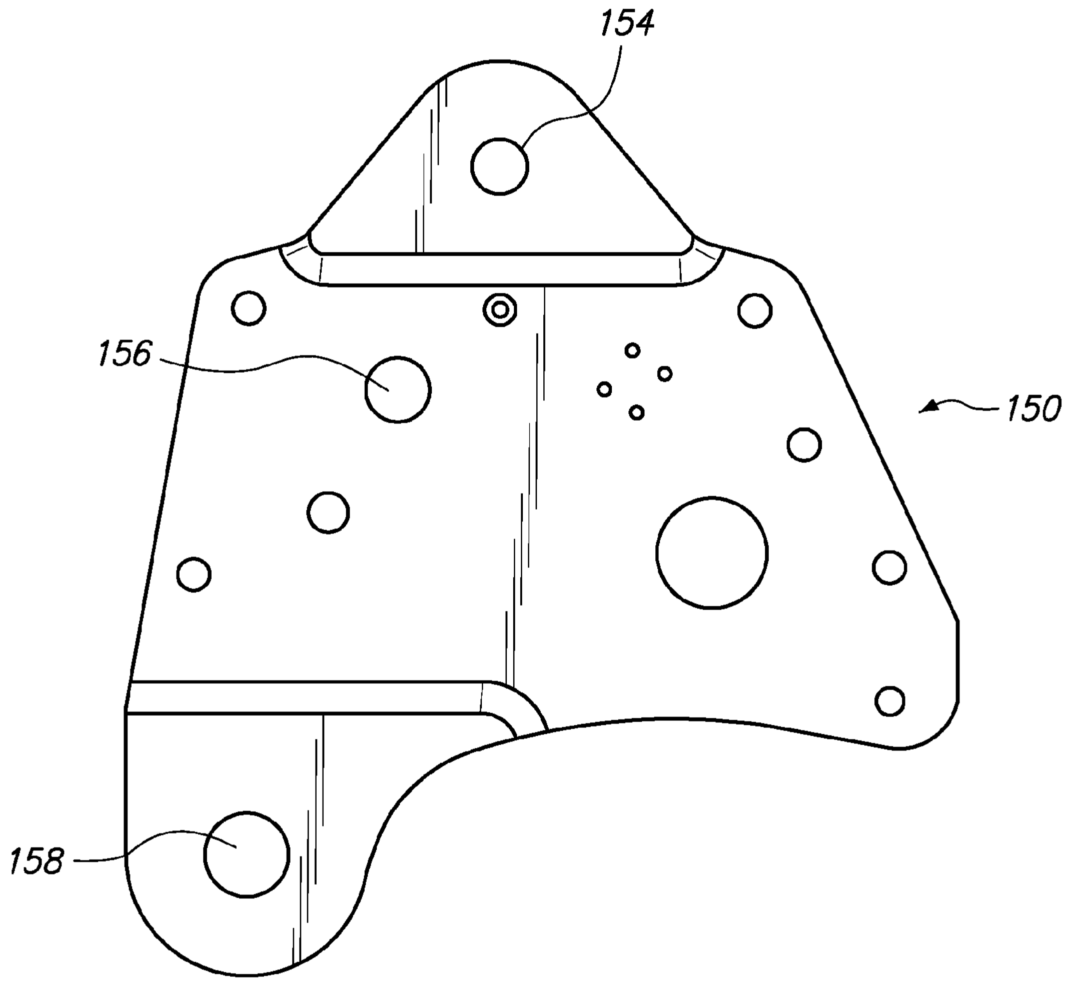
FIG. 6 is a plan view of the first side plate used in production of the main body of the hook assembly.

FIG. 6 shows a plan view of the first side plate 150. Second side plate 152 is a mirror image of first side plate 150. Plate 150 includes a top hole 154 for securing to the swivel 106. A middle hole 156 is fitted to the emergency cargo-release subsystem 112. Finally, there is a large hole 158 that supports the load arm 134 in attachment to the hook assembly 110.

Figure 7:
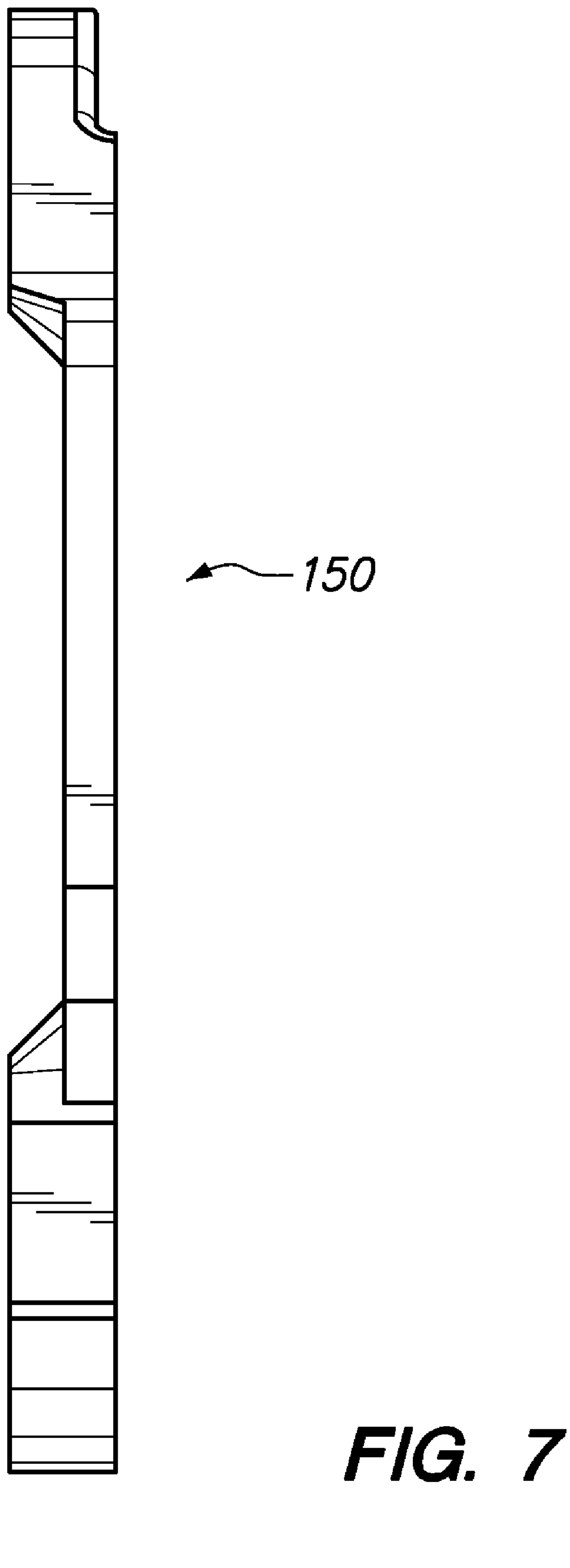
FIG. 7 is a front edge view of the first side plate in FIG. 6.

FIG. 7 is a front edge view of the first plate 150, showing the reduction in weight produced by scaling down the width of material used in the central region, with thicker material applied over the load bearing sections.

Figure 8:
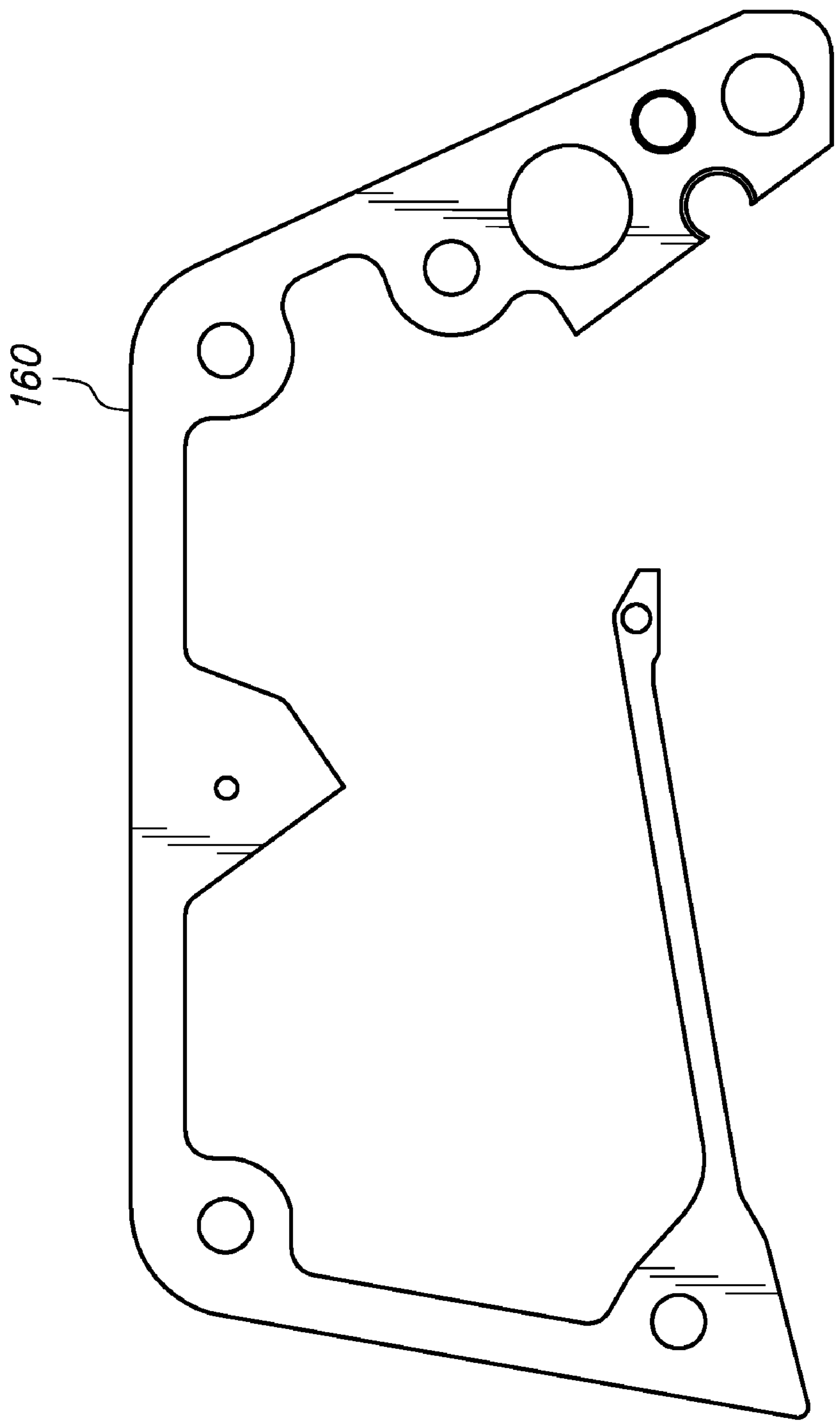
FIG. 8 is a plan view of the central spacer used in production of the main body.

FIG. 8 is a view showing the central spacer 160, which is affixed between the first and second side plates 150 and 152 in the production of the main body. As seen from the profile in FIG. 8, in addition to being produced of a lightweight material, the central spacer 160 utilizes a minimal amount of material. There is sufficient material left to engage the periphery of the side plates 150 and 152, however, providing reinforcement to the load bearing regions to provide the strength and durability required for the expected loads of the assembly 110. These regions mainly comprise the swivel assembly attachment at hole 154, and the location for attachment of the load arm 134 at hole 158.

Thus, when the main body 130 is fully assembled, the interior has large regions of open space, reducing both the amount of material and overall weight of the assembly 110.

The cargo hook assembly 110 is produced of lightweight materials, particularly as to the hook assembly main body 130, load arm 134 and keeper 136. It is now observed that a cargo hook assembly 110 of sufficient strength to support a cargo 104 load of 26,000 pounds and more can be obtained in a hook assembly 110 of as little as 45 pounds total weight, or less. The components materials employed are high strength metal alloys, preferably having a relatively low density. The use of high strength materials such as γ-titanium aluminides as well as aluminum-metal-matrix-composites, and the like, are particularly appropriate materials for this purpose. 7075-T6 aluminum alloy is a preferred material for forming the main body side plates 150 and 152 and central spacer 160.

Other high strength aluminum alloys, titanium metal alloys and other metallic and non-metallic high strength materials, including the various reinforced and composite materials known to the art, may also be suitable.

The result is cargo hook assembly 110 that reduces the weight required to be carried by an aircraft.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

We claim:

1. A cargo hook assembly for securing cargo external to an aircraft for transportation, comprising, a main body;

an upper load bearing section formed on an upper end of the main body and configured to attach to a pendent sling, wherein the upper load bearing section has a larger width than the main body;

a lower load bearing section formed on a lower end of the main body, wherein the lower load bearing section has a larger width than the main body; and a disengage unit rotatably attached to the lower load bearing second and configured to detachably engage with the cargo.

2. The cargo hook assembly of claim 1, wherein the disengage unit is configured to support a load of at least about 22,000 pounds during transportation at aircraft speeds of at least about 100 knots.

3. The cargo hook assembly of claim 1, wherein:

the main body comprises a first plate and a second plate;

the upper load bearing section is formed on an upper end of the first plate and an upper end of the second plate; and the lower load bearing section is formed on a lower end of the first plate and a lower end of the second plate.

4. The cargo hook assembly of claim 3, further comprising a spacer affixed between the first plate and the second plate, wherein the upper load bearing section of the first plate and the upper load bearing section of the second plate extend over the spacer.

5. The cargo hook assembly of claim 4, wherein the spacer is only affixed around a periphery of the main body.

6. The cargo hook assembly of claim 1, wherein the upper load bearing section includes a first hole for securing to a swivel and the lower load bearing section includes a second hole for retaining a load arm of the disengage unit.

7. The cargo hook assembly of claim 3, wherein:

the upper load bearing section of the first plate and the lower load bearing section of the first plate are each thicker than the main body of the first plate; and the upper load bearing section of the second plate and the lower load bearing section of the second plate are each thicker than the main body of the second plate.

8. The cargo hook assembly of claim 1, wherein the main body, upper load bearing section, and lower load bearing section comprise a high-strength, lightweight alloy.

9. The cargo hook assembly of claim 8, wherein the alloy is an aluminum alloy.

10. The cargo hook assembly of claim 9, wherein the aluminum alloy is selected from the group of aluminum alloys consisting of as I-titanium aluminides and aluminum-metal-matrixcomposites.

11. The cargo hook assembly of claim 9, wherein the alloy is 7075—T6 aluminum alloy.

12. The cargo hook assembly of claim 8, wherein the alloy is high tensile strength steel Alloy.

13. The cargo hook assembly of claim 8, wherein the alloy is high tensile strength titanium-based alloy.

14. The cargo hook assembly of claim 1, wherein the aircraft is a helicopter.

15. The cargo hook assembly of claim 1, wherein the aircraft is an airplane.

16. The cargo hook assembly of claim 14, wherein the airplane is a propeller powered aircraft.

17. The cargo hook assembly of claim 14, wherein the airplane is a jet powered aircraft.

18. A cargo hook assembly, comprising, a first plate;

a second plate;

a load arm attached between the first plate and the second plate;

a first upper load bearing section formed on an upper end of a main body section of the first plate, wherein the first upper load bearing section is thicker than the main body section of the first plate; and a second upper load bearing section formed on an upper end of a main body section of the second plate, wherein the second upper load bearing section is thicker than the main body section of the second plate.

19. The cargo hook assembly of claim 18, further comprising a spacer affixed around a perimeter of the main body section of the first plate and the second plate.

20. The cargo hook assembly of claim 19, wherein the spacer further comprises:

a first section affixed between a first side of the main body section of the first plate and a first side of the main body section of the second plate;

a second section affixed between a second side of the main body section of the first plate and a second side of the main body section of the second plate; and a third section extending between a top end of the first section and a top end of the second section and affixed between the upper end of the main body section of first plate and the upper end of the main body section of the second plate.

21. The cargo hook assembly of claim 18, further comprising:

a first lower load bearing section formed on a lower end of the main body section of the first plate, wherein the first lower load bearing section is thicker than the main body section of the first plate and attaches to a first side of the load arm; and a second lower load bearing section formed on a lower end of the main body section of the second plate, wherein the second lower load bearing section is thicker than the main body section the second plate and attaches to a second side of the load arm.

22. The cargo hook assembly of claim 21, further comprising a spacer affixed between the main body section of the first plate and the main body section of the second plate above the first lower load bearing section and second lower load bearing section.

23. The cargo hook assembly of claim 21, wherein the spacer further comprises:

a first section affixed between a first side of the main body section of the first plate and a first side of the main body section of the second plate;

a second section affixed between a second side of the main body section of the first plate and a second side of the main body section of the second plate; and a third section affixed between the lower end of the main body section of the first plate and the lower end of the main body section of the second plate.

* * * * *

UNITED STATES PATENT AND TRADEMARK OFFICE

CERTIFICATE OF CORRECTION

PATENT NO. : 8,172,184 B2
APPLICATION NO. : 12/366530
DATED : May 8, 2012
INVENTOR(S) : Spencer et al.

It is certified that error appears in the above-identified patent and that said Letters Patent is hereby corrected as shown below:

Column 6, line 4, delete “Alloy” and insert --alloy--, therefor.

Column 6, line 58, after “section” insert --of--.

Signed and Sealed this
Fourth Day of December, 2012

David J. Kappos

*Director of the United States Patent and Trademark Office*

UNITED STATES PATENT AND TRADEMARK OFFICE

CERTIFICATE OF CORRECTION

PATENT NO. : 8,172,184 B2
APPLICATION NO. : 12/366530
DATED : May 8, 2012
INVENTOR(S) : Ken Spencer et al.

It is certified that error appears in the above-identified patent and that said Letters Patent is hereby corrected as shown below:

In the Claims

Column 5, line 29, delete “second” and insert --section--, therefor.

Column 5, line 60, after “body,” insert --the--.

Column 5, line 60, after “and” insert --the--.

Column 5, line 66, delete “as”.

Column 5, line 66, delete “I” and insert --γ--, therefor.

Column 6, line 45, before “first” insert --the--.

Column 6, line 64, after “and” insert --the--.

Column 6, line 66, delete “21” and insert --22--, therefor.

Signed and Sealed this
Twenty-ninth Day of April, 2014

Michelle K. Lee

Michelle K. Lee
*Deputy Director of the United States Patent and Trademark Office*